US012313401B2

(12) United States Patent
Gronback

(10) Patent No.: US 12,313,401 B2
(45) Date of Patent: May 27, 2025

(54) CHAMFER GAGE WITH INTERCHANGEABLE ANVILS

(71) Applicant: Alpha Q, Inc., Colchester, CT (US)

(72) Inventor: Philip Gronback, Scotland, CT (US)

(73) Assignee: ALPHA Q, INC., Colchester, CT (US)

( * ) Notice: Subject to any disclaimer, the term of this patent is extended or adjusted under 35 U.S.C. 154(b) by 23 days.

(21) Appl. No.: 15/486,829

(22) Filed: Apr. 13, 2017

(65) Prior Publication Data

US 2017/0299367 A1 Oct. 19, 2017

Related U.S. Application Data

(60) Provisional application No. 62/322,439, filed on Apr. 14, 2016.

(51) Int. Cl.
| | |
|---|---|
| *G01B 5/20* | (2006.01) |
| *G01B 3/22* | (2006.01) |
| *G01B 3/26* | (2006.01) |
| *G01B 3/56* | (2006.01) |
| *G01B 5/24* | (2006.01) |
| *B23C 3/12* | (2006.01) |

(52) U.S. Cl.
CPC ............... *G01B 5/243* (2013.01); *G01B 3/22* (2013.01); *G01B 3/26* (2013.01); *G01B 3/56* (2013.01); *G01B 5/20* (2013.01); *B23C 3/12* (2013.01)

(58) Field of Classification Search
CPC ...................................................... G01B 5/243
USPC ........... 33/537, 836, 501.05, 501.08, 501.09, 33/501.45, 542
See application file for complete search history.

(56) References Cited

U.S. PATENT DOCUMENTS

| | | | | |
|---|---|---|---|---|
| 1,921,791 A | * | 8/1933 | Syme ..................... | G01B 3/004 |
| | | | | 200/84 R |
| 1,928,528 A | * | 9/1933 | Gagnon ................... | G01B 3/28 |
| | | | | 33/542 |
| 2,801,474 A | * | 8/1957 | Field ........................ | G01B 5/08 |
| | | | | 33/520 |
| 2,975,524 A | * | 3/1961 | Field ........................ | G01B 3/56 |
| | | | | 33/534 |
| 2,979,824 A | * | 4/1961 | Hymer ..................... | G01B 3/18 |
| | | | | 33/531 |
| 3,848,339 A | * | 11/1974 | Strasbaugh .............. | G01B 3/24 |
| | | | | 33/507 |
| 4,486,954 A | * | 12/1984 | Mock ....................... | G01B 3/56 |
| | | | | 33/533 |

(Continued)

FOREIGN PATENT DOCUMENTS

DE         3910237 A1 * 10/1990 ............... G01B 3/22

*Primary Examiner* — Yaritza Guadalupe-McCall
(74) *Attorney, Agent, or Firm* — Robinson & Cole LLP

(57) ABSTRACT

Applicant has disclosed a chamfer gage with interchangeable anvil assemblies which can measure the diameter of chamfered holes and the chamfer angle (up to 135°). In the preferred embodiment, the chamfer gage comprises: an indicator housing; a compression fitting, attached to the housing, for securing an indicator spindle for movement inside the housing; and an interchangeable anvil assembly, having an anvil body with a depressible anvil or plunger inside, which can be detachably connected to the indicator housing by a threaded thumb ring rotatably mounted on the housing. Another interchangeable anvil assembly can be swapped within thirty seconds to measure the chamfer of a different hole size.

8 Claims, 5 Drawing Sheets

(56) References Cited

U.S. PATENT DOCUMENTS

| | | | | | |
|---|---|---|---|---|---|
| 4,977,681 | A | * | 12/1990 | Jiles | G01B 3/46 33/544.5 |
| 5,201,131 | A | * | 4/1993 | Wilkins | G01B 5/004 33/1 M |
| 5,714,686 | A | * | 2/1998 | Penjaska | G01B 5/243 33/536 |
| 6,121,890 | A | * | 9/2000 | Tetreault | G01B 3/22 33/558 |
| 6,490,805 | B1 | * | 12/2002 | Forschler | G01B 3/46 33/542 |
| 2012/0304477 | A1 | * | 12/2012 | Zhang | G01B 3/28 33/701 |

* cited by examiner

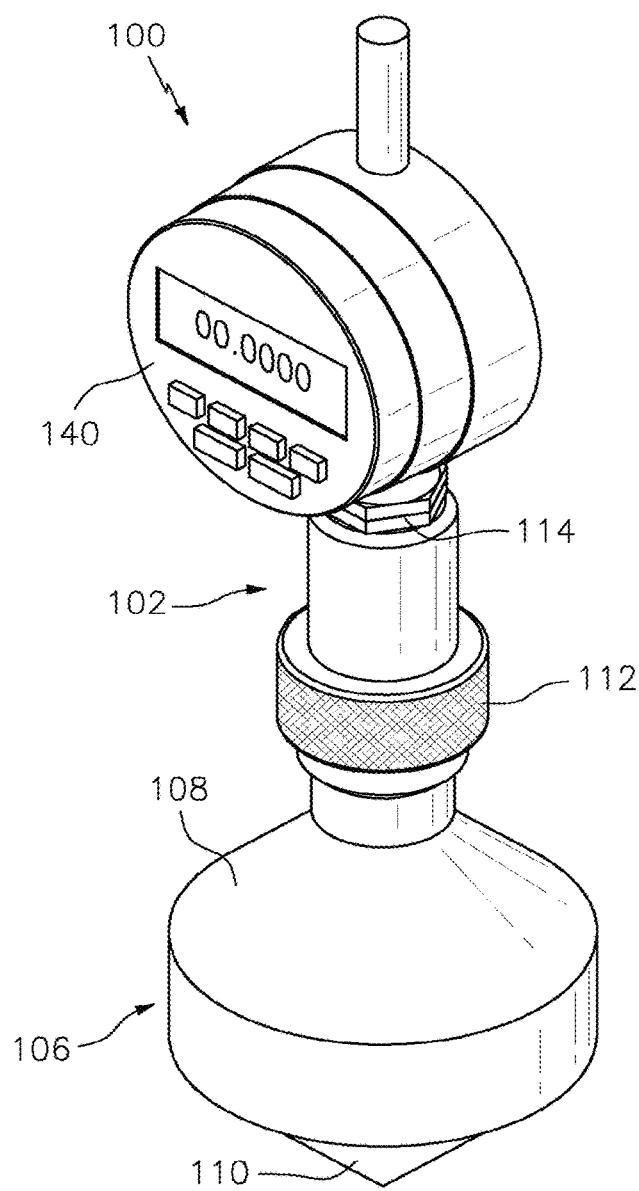
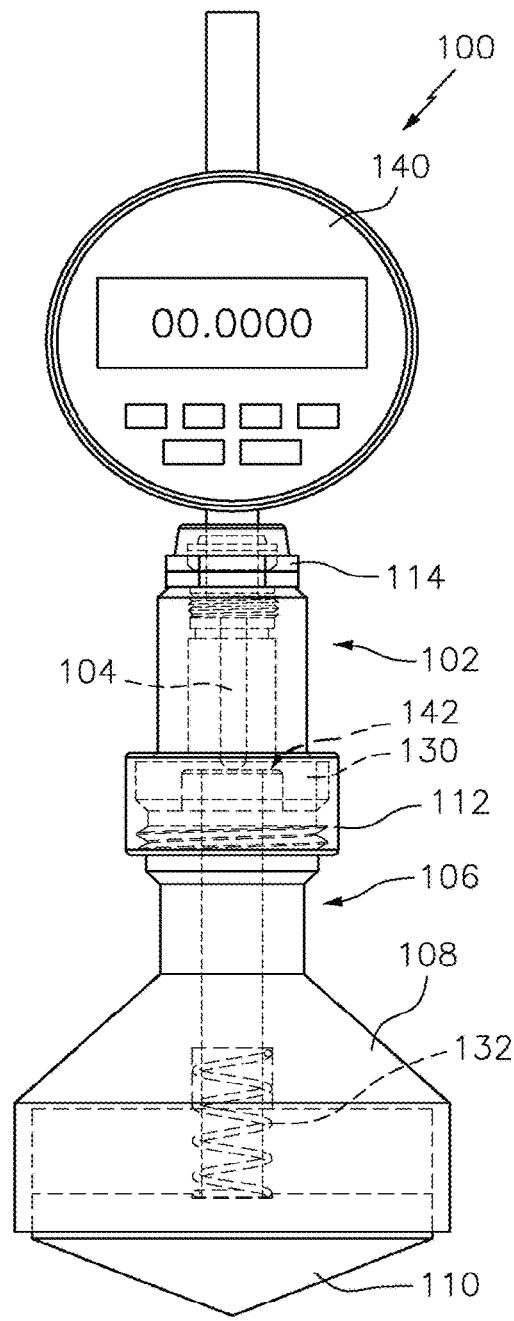
*FIG. 1*  *FIG. 2*

FIG. 6

Reference Diameter 0.20000 in

140

Measure Reference

Calibrated
- Offset 0.0048
- Diameter 0.0231

Measure Reference 0.19670

Save Calibrated Offset

Status
Connected

Reading
0.15248 in

Clear Gage

Parameters
Ratio: 4.8284
Offset: 0.0041 in
Diameter: 0.0198 in

Refresh

Enter New Ratio
4.8284

Save

1

CHAMFER GAGE WITH INTERCHANGEABLE ANVILS

RELATED APPLICATION

This application claims priority from U.S. Provisional Patent Application, Ser. No. 62/322,439, entitled "CHAMFER GAGE", filed Apr. 14, 2016. Applicant hereby incorporates that prior application by reference in its entirety.

FIELD OF INVENTION

This invention relates to chamfer gages.

BACKGROUND OF THE INVENTION

Chamfer gages on the market today that measure internal chamfer size typically are limited in size range due to fixed anvils. Due to the indicator bodies and anvil bodies being constructed as one-piece mechanisms, the range of hole sizes is limited to the diameter of the anvil. In addition, current chamfer gages use anvils with sharper angles which limits the degree of the gages measurement range.

Chamfer gage models available in the market use a three-blade method of measuring versus a solid anvil which does not offer full contact throughout the entire feature. This allows for inaccurate readings that may exist due to imperfections in the chamfer feature.

It is a principal object of the present invention to provide a quick and easy way to measure a large end size of any chamfer (up to 135°) of any straight hole size which is free of any edge break.

It is a more specific object to provide a chamfer gage with detachable anvil bodies (each with a different sized plunger) which: enables a greater range of measurement; and allows the user to check multiple part features with one instrument.

SUMMARY OF THE INVENTION

Applicant has disclosed a unique chamfer gage, which provides a quick and easy way to measure the size of a large end of any chamfer (up to 135°) of any straight hole size which is free of any edge break.

Applicant's invention can be thought of as a chamfer gage comprising an interchangeable anvil assembly having an anvil body, with a depressible anvil housed inside the anvil body, detachably connected to a remainder of the chamfer gage by an internally threaded ring threaded onto a collar of the anvil body. Another anvil assembly, with a different length or angle anvil, can be swapped within thirty seconds.

BRIEF DESCRIPTION OF THE DRAWINGS

The above and other objects of the current invention will become more readily understood when the following text is read in conjunction with the accompanying drawings in which:

FIG. 1 is a perspective view of a preferred embodiment of a chamfer gage constructed in accordance with the present invention;

FIG. 2 is a front plan view of the chamfer gage shown in FIG. 1;

FIG. 6 depicts a close-up of the face of an exemplary digital indicator.

DETAILED DESCRIPTION OF THE PREFERRED EMBODIMENT(S)

Figure 3:
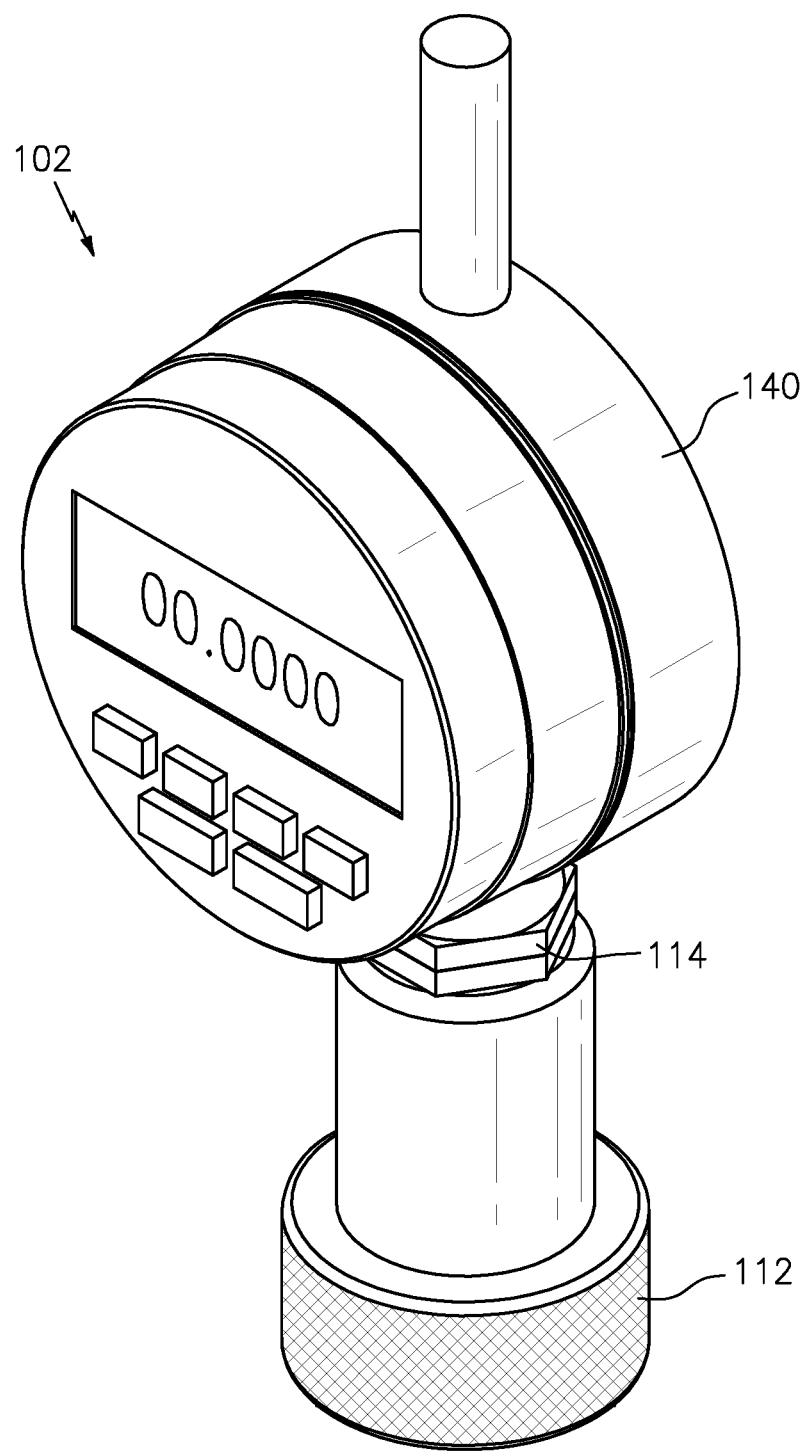
FIG. 3. is a front plan view of a digital indicator assembly, detached from an anvil assembly, shown in FIGS. 1 and 2.

Applicant has disclosed a preferred embodiment of a chamfer gage with interchangeable anvil assemblies. This "multi-anvil" gage provides a quick and easy way to measure the size of a large end of any chamfer (up to 135°) or any straight hole size which is free of any edge break.

Glastonbury Southern Gage, located in Colchester, Connecticut (USA) manufactures and markets this chamfer gage 100 as "GSG Multi-Anvil Chamfer Gage".

As best shown in FIGS. 1-6, the preferred chamfer gage 100 comprises: an indicator housing or main body 102 (see FIGS. 1-3); an indicator spindle 104 inside housing 102 (see FIG. 2); an interchangeable anvil assembly (e.g., 106—see FIGS. 1, 2, 4) having an anvil body (e.g., 108), with a depressible anvil or plunger (e.g., 110), detachably connected to a remainder of the chamfer gage 100 (e.g., the indicator housing 102) by an internally threaded, cylindrical, thumb ring 112; and a compression fitting (e.g., a nut) 114 which secures the indicator spindle 104 and allows the indicator spindle 104 to travel freely within the indicator housing 102.

The drawings show two exemplary detachable and interchangeable anvil assemblies 106, 116. All anvil assemblies (e.g., 106, 116), contemplated by this invention, are similar shaped, though are mostly differently sized.

Figure 4:
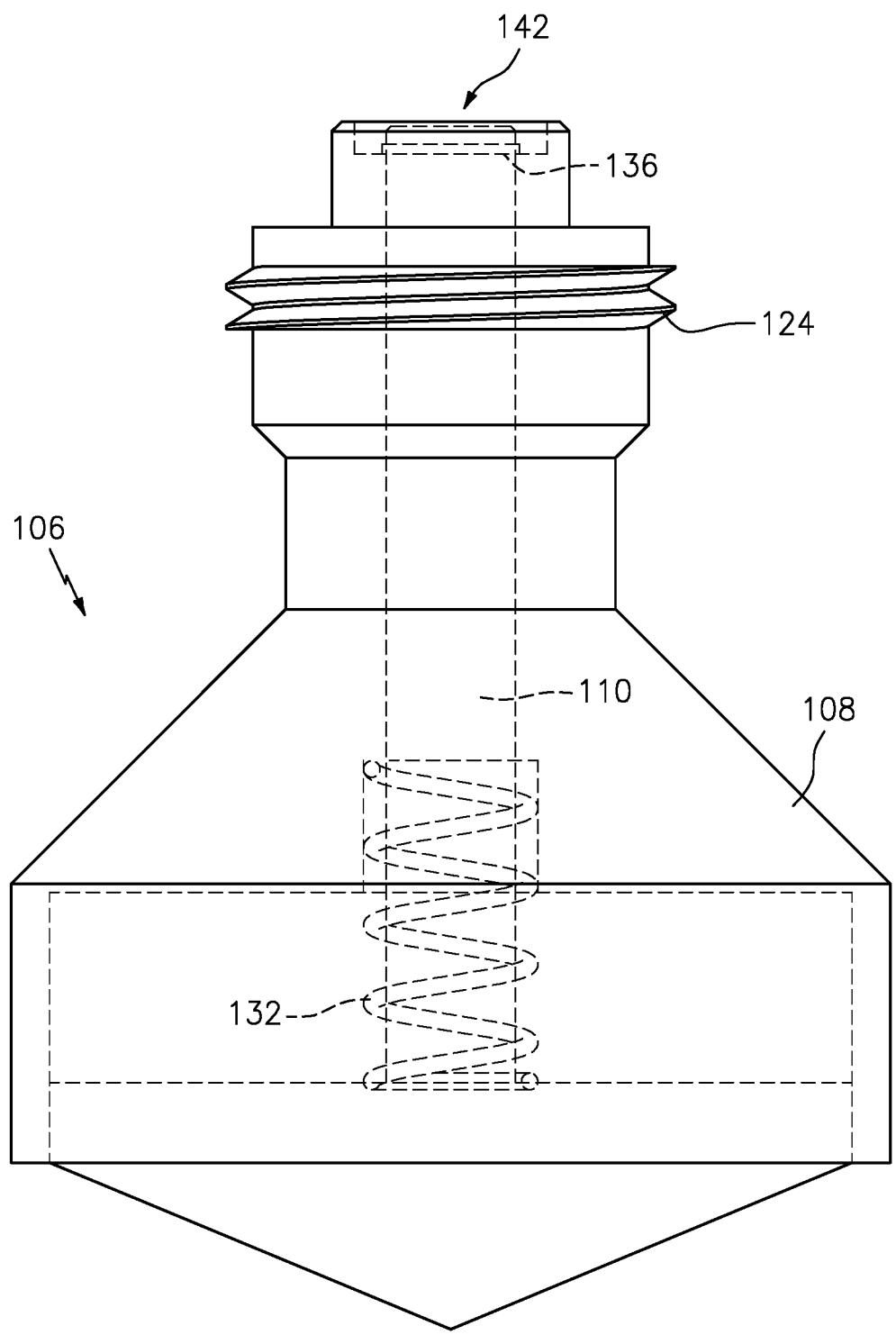
FIG. 4 is a plan view of the detached anvil assembly.
Figure 5:
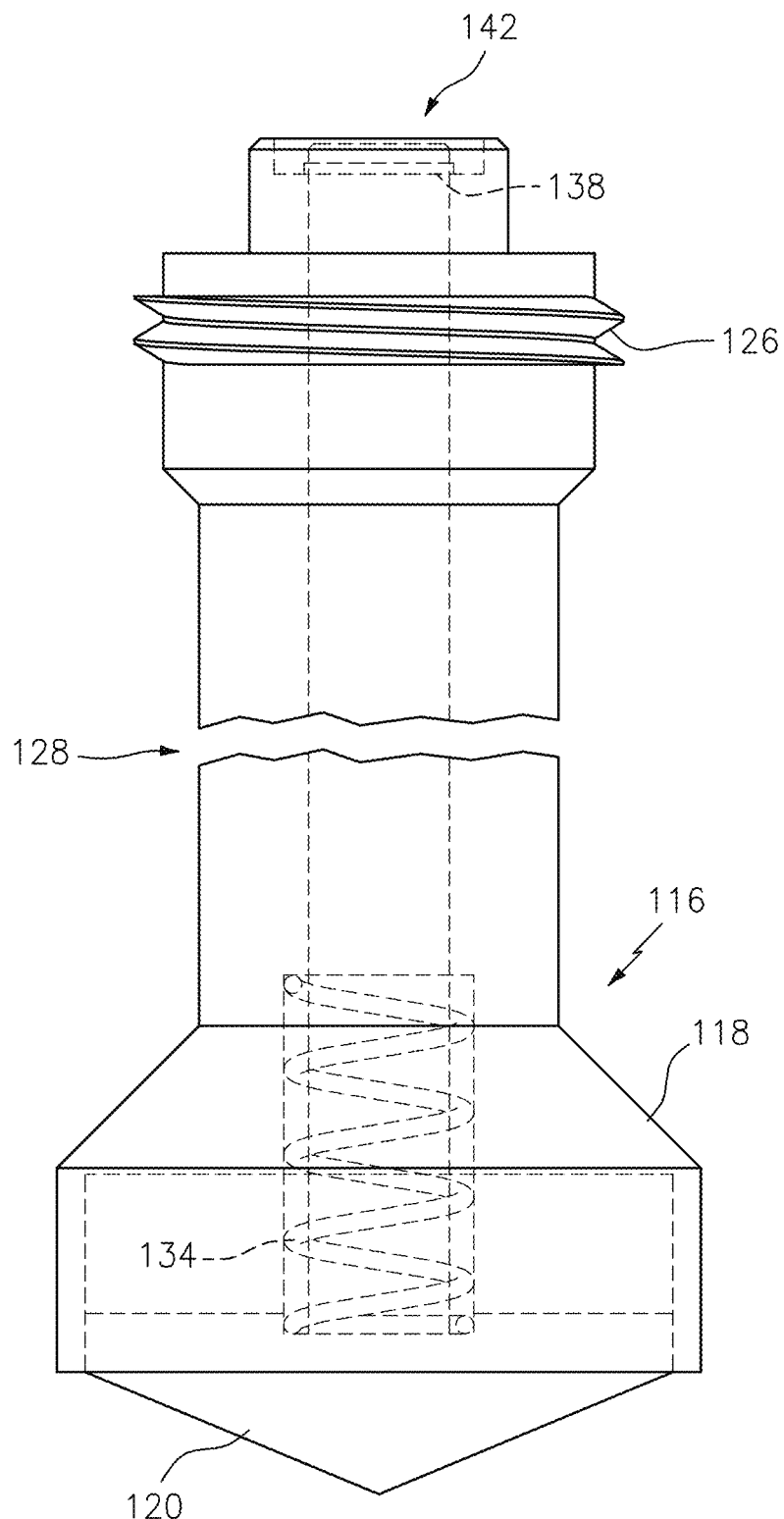
FIG. 5 is a plan view of an alternate (and interchangeable) anvil assembly attachable to the same digital indicator assembly.

Anvil assemblies 106, 116 have anvil bodies 108, 118, which respectively contain: a depressible 2.500"×135° anvil or plunger 110 (see FIGS. 1, 2, 4); and a depressible 0.750"×135° anvil 120 (see FIG. 5). Each of the exemplary anvil bodies 108, 118 contains like parts.

To secure an anvil body 108, 118 to the indicator housing 102, the thumb ring 112 (preferably knurled on the outside) is tightened down (i.e., threaded) onto a threaded collar 124, 126 of the particular anvil body 108, 118. See FIGS. 1 and 2. As best shown in FIGS. 4, 5, the collars 124, 126 are substantially the same size (i.e., width and length) in each anvil body 108, 118; and those collars are substantially threaded the same. Otherwise, anvil assemblies 106, 116 have different widths. FIG. 5 shows anvil assembly 116 split (at 128) to indicate possible different lengths.

Thumb ring 112 is rotatably mounted on the main body 102. Thumb ring 112 preferably is cylindrical (see FIGS. 1-3). Thumb ring 112 straddles a bottom protrusion 130 of the main body 102 (see FIG. 2). That way, the thumb ring 112 is freely rotatable without easily falling off the body 102.

When an anvil (e.g., 110, 120) is depressed, it is allowed to travel within the anvil body (e.g., 108, 118) in a linear motion which is kept taut by a coil spring (e.g., 132, 134) and retained within the housing by a C-clip (e.g., 136, 138).

This preferred chamfer gage 100, with its interchangeable anvil assemblies (e.g., 106, 116), allows a user: to interchange anvil assemblies (e.g., 106, 116) in thirty seconds or less; and to check chamfers and tapered hole diameters.

The chamfer gage 100 is statistical process control (SPC) capable. Statistical process control is a method of quality control which uses statistical methods. SPC is applied in order to monitor and control a process. Monitoring and controlling the process ensures that it operates at its full potential.

FIG. 6 depicts a close-up of an exemplary digital indicator 140 (preferably LCD) housed partly within indicator housing 102. This digital indicator is programmed with a formula to automatically calculate size based on both the drop of the indicator spindle 104 and the angle of the anvil (e.g., 110). The digital indicator 140 forms no portion of the present invention, since other indicators (even analog) could be used as well.

Glastonbury Southern Gage's preferred, proprietary formula is:

//Special Code add ratio and offset regardless
//Show 0 if close to abs offset (if raw encoder count is 10 or less (<0.0005"), display zero, otherwise show offset reading)

$n$Value=EncValueRaw<=10?0:
  EncValueRaw*$n$Multiplier+$n$Offset;

//Multiply by Ratio $n$Value=$n$Value*$n$Ratio;

For the chamfer firmware the values used were
nMultiplier=Encoder count to English conversion (typically 0.00005")
nOffset=0.00410"
nRatio=4.82843

This formula is programmed directly within any suitable internal circuit board of the digital indicator 140 (e.g., Chicago Dial Indicator's Logic™ ALG Q3210-3-00001) to prevent the user (not shown) from being able to alter the displayed results. The manner in which the digital indicator 140 is programmed will also allow for the gage to be calibrated on a periodic basis.

As best shown in FIG. 2, spindle 104 of the digital indicator 140 is held at a predetermined distance within the housing 102 to ensure the spindle makes contact with a top surface (e.g., 142) of the anvil (e.g., 110).

Though not shown, by placing the anvil (e.g., 110)(see FIG. 1) against a flat surface so that the anvil (e.g., 110) is retracted or depressed flush and setting zero on the digital indicator 140 (not part of the invention), the user then is ready to measure the part feature. Upon placing the anvil within a chamfer feature or a straight hole (not shown) which is void of any edge break, the size of the large end or hole is displayed on the LCD display of the digital indicator 140.

Applicant's invention can be thought of broadly as a method of substituting interchangeable anvil assemblies in a chamfer gage, the method comprising:

a. an end-user removing an interchangeable first anvil assembly from a remainder of the chamfer gage by unscrewing a threaded ring, rotatably attached to the housing, from a threaded first collar of the first anvil assembly.
  i. wherein the first anvil assembly includes a first anvil body with a depressible first anvil housed in the anvil body; and
  ii. wherein the first anvil body includes the threaded first collar.
b. the end-user attaching a second interchangeable anvil assembly, having a second anvil body with a depressible second anvil; to the housing by screwing the threaded ring onto a threaded second collar of the second anvil body; and
c. wherein the threaded first collar and the threaded second collar are substantially identical.

The digital indicator 140, indicator housing 102, indicator spindle 104, compression fitting 114, and thumb ring 112 together comprise the digital indicator assembly mentioned in the section, Brief Description of the Drawings. Applicant's invention therefore can be thought of as a digital indicator assembly to which an end user can attach interchangeable, differently sized, anvil assemblies (e.g., 106, 116) by tightening down the thumb ring onto a threaded collar of the desired anvil assembly.

It should be understood that obvious structural modifications can be made without departing from the spirit or scope of the invention. For example, additional anvil assemblies with still different lengths, widths, and anvil angles can be made. Accordingly, reference should be made primarily to the following claims rather than the foregoing specification to better understand the scope of the invention.

What is claimed is:

1. A method of substituting an interchangeable anvil assembly in a chamfer gage, the method comprising:
  a. an end-user removing an interchangeable first anvil assembly, having a first anvil body with a depressible first anvil, from an indicator housing of the chamfer gage by unscrewing a threaded ring, rotatably attached to the housing, from a threaded first collar in a top portion of the first anvil body;
  b. the end-user attaching an interchangeable second anvil assembly, having a second anvil body with a depressible second anvil; to the housing by screwing the threaded ring onto a threaded second collar of the second anvil body; and
  c. wherein the threaded first collar and the threaded second collar are substantially identical.

2. The method of claim 1 wherein the first anvil and second anvil have different lengths.

3. The method according to claim 1 wherein the first anvil and second anvil have different widths.

4. The method according to claim 1 wherein the first anvil and second anvil have different angles.

5. A method of substituting interchangeable anvil assemblies in a chamfer gage, the method comprising:
  a. an end-user removing an interchangeable first anvil assembly from a remainder of the chamfer gage by unscrewing a threaded ring, rotatably attached to the remainder, from a threaded first collar of the first anvil assembly;
    i. wherein the first anvil assembly includes a first anvil body with a depressible first anvil housed in the anvil body; and
    ii. wherein the first anvil body includes the first threaded collar;
  b. the end-user attaching a second interchangeable anvil assembly, having a second anvil body with a depressible second anvil to the housing by screwing the threaded ring onto a threaded second collar of the second anvil body; and
  c. wherein the threaded first collar and the threaded second collar are substantially identical.

6. The method of claim 5 wherein the first anvil and second anvil are of different lengths.

7. A chamfer gage comprising:
  a. an indicator housing of the chamfer gage;
  b. a compression fitting to secure an indicator spindle to the housing; and
  c. an interchangeable anvil assembly having an anvil body, with a depressible anvil housed inside the body, detachably connected to the indicator housing by an internally threaded ring threaded onto a threaded collar of the anvil body.

8. The chamfer gage of claim 7 wherein the threaded ring is rotatably mounted on the fitting.

\* \* \* \* \*